(12) United States Patent
Herrnsdorf et al.

(10) Patent No.: US 7,994,599 B2
(45) Date of Patent: Aug. 9, 2011

(54) DEVICE FOR THE DETECTION OF ELECTROMAGNETIC WAVES AND METHOD FOR PRODUCING SUCH A DEVICE

(75) Inventors: Johannes Herrnsdorf, Herdecke (DE); Georg Stute, Velbert (DE); Stefan Andreas Roessinger, Erkrath (DE); Joachim Winterfeldt, Schwerte (DE); Dirk Enderlein, Waltrop (DE)

(73) Assignee: MEAS Deutschland GmbH, Dortmund (DE)

( * ) Notice: Subject to any disclaimer, the term of this patent is extended or adjusted under 35 U.S.C. 154(b) by 679 days.

(21) Appl. No.: 11/993,888

(22) PCT Filed: Jun. 27, 2005

(86) PCT No.: PCT/EP2005/006898
§ 371 (c)(1),
(2), (4) Date: Jul. 10, 2008

(87) PCT Pub. No.: WO2007/000172
PCT Pub. Date: Jan. 4, 2007

(65) Prior Publication Data
US 2011/0024860 A1 Feb. 3, 2011

(51) Int. Cl.
*H01L 29/56* (2006.01)
*H01L 21/50* (2006.01)
(52) U.S. Cl. ................................................. 257/433
(58) Field of Classification Search .............. 250/352, 250/353, 338.1; 257/81, 82, 91, 98–100, 257/116, 117, 432–437, 749, E33.056–E33.059, 257/E25.032, 737, 738, E23.021, E23.069, 257/667, 787–796, 295, E43.001, E43.007, 257/E27.005–E27.006, E27.008, E29.164, 257/E29.167, E29.272, E29.323, E27.104, E21.436, E21.663–E21.665; 438/51, 55, 64, 68, 83, 93, 98, 100, 101, 111, 112, 123, 124, 411, 412, 461, 584, 597–688, 25–28
See application file for complete search history.

(56) References Cited

U.S. PATENT DOCUMENTS

| | | | |
|---|---|---|---|
| 5,962,854 A | 10/1999 | Endo | |
| 2002/0086500 A1* | 7/2002 | Wu et al. | 438/455 |
| 2002/0117623 A1* | 8/2002 | Cole | 250/338.1 |

(Continued)

FOREIGN PATENT DOCUMENTS

DE 41 02 524 A1 8/1991

(Continued)

OTHER PUBLICATIONS

Translation of Japanese Office Action dated Jan. 18, 2011 related to JP Application No. 2008517333.
Office Action dated Mar. 16, 2010 associated with counterpart European Patent Application N°05769971.2.

*Primary Examiner* — Dao H Nguyen
*Assistant Examiner* — Tram H Nguyen
(74) *Attorney, Agent, or Firm* — Howard IP Law Group, PC

(57) ABSTRACT

Device for the detection of electromagnetic waves with
  a first plate that contains a membrane and a detector structure fixed at least partially to the membrane,
  a second plate attached to the first plate,
  at least one contact point for surface mount technology on the first and/or second plate,
  whereby in a connection line between the detector structure and the contact point is at least partially led through the first and/or the second plate and that this connection line is at least partially prepared by film deposition and/or plating.

37 Claims, 1 Drawing Sheet

U.S. PATENT DOCUMENTS

| | | |
|---|---|---|
| 2002/0180013 A1 | 12/2002 | Brofman et al. |
| 2003/0141455 A1* | 7/2003 | Lambert et al. ............... 250/353 |
| 2003/0222218 A1* | 12/2003 | Nozu ......................... 250/338.1 |
| 2004/0077154 A1 | 4/2004 | Nagarajan et al. |
| 2004/0229398 A1 | 11/2004 | Magerlein et al. |
| 2005/0082682 A1* | 4/2005 | Liu ............................... 257/778 |
| 2005/0116255 A1* | 6/2005 | Kato et al. .................... 257/200 |
| 2006/0157274 A1* | 7/2006 | Stark ............................ 174/564 |
| 2009/0078456 A1* | 3/2009 | Macropoulos et al. ....... 174/261 |

FOREIGN PATENT DOCUMENTS

| | | |
|---|---|---|
| DE | 197 10 946 A1 | 9/1998 |
| DE | 199 23 606 A1 | 1/2000 |
| DE | 199 13 672 A1 | 11/2000 |
| JP | 9-329499 | 12/1997 |
| JP | 10-318829 | 12/1998 |

* cited by examiner

DEVICE FOR THE DETECTION OF ELECTROMAGNETIC WAVES AND METHOD FOR PRODUCING SUCH A DEVICE

BACKGROUND OF THE INVENTION

The invention relates to a device for the detection of electromagnetic waves, especially waves of the infrared spectrum, and a method for producing such a device.

Miniature devices for the detection of electromagnetic waves are used for a multitude of purposes. Particularly in medical devices, like for example a so called "ear thermometer", devices for the detection of electromagnetic waves in the infrared spectrum are already broadly used today. Home climate control, home safety and alarm systems, automotive applications, such as in-door climate control, replacement of pyrometers and many other industrial applications offer multiple future uses for such devices.

In the field of infrared sensors, DE 199 23 606 A1 describes a device for the detection of electromagnetic waves that contains a lower mounting plate, on which a substrate with a detector structure is built. A top plate is attached to the lower mounting plate while distance maintaining support structures keep a distance between the top and the lower plate. The top plate has a lens that is produced on the top plate by means of micro mechanics. The lower plate has a cavity that opens towards its lower (rear) end and terminates at a thin membrane at its top (front) end on which the detector structure is built.

In a further embodiment, DE 199 23 606 A1 teaches the detector structure to be affixed to a thin membrane, which thin membrane is then affixed to the (only) top plate.

DE 199 23 606 A1 discloses the lower plate and the support structures to be built on the wafer level as well as the top plate to be manufactured as part of a wafer. According to DE 199 23 606 A1, the two wafers are aligned and connected to each other, after which the respective sensors are produced by separation.

The devices disclosed in DE 199 23 606 A1 are considered to measure inaccurately and to require costly production methods. Furthermore connecting the detection structure of the disclosed devices to subsequent electronic evaluation devices is either space consuming or difficult to achieve.

From DE 41 02 524 A1 an infrared sensor is known with a detector structure being fixed to the front side of a semi conductor substrate (thermistor). This thermistor is attached to a lower plate with its backside. Connections for the detector structure are led through the lower plate. At the topside of the lower plate (to which the thermistor is also attached) free standing wires connect the connections in the second plate to connectors on the detector structure and the thermistor.

The lower plate carrying the thermistor is covered by a cup-shaped cover that is affixed to the sidewalls of the lower plate.

The device known from DE 41 02 524 A1 is disadvantageous, because it is difficult and costly to produce.

SUMMARY OF THE INVENTION

Starting from this background, it is an object of the invention to suggest a device for the detection of electromagnetic waves that can be produced in a cheaper way. It is a further object of the invention to suggest a device for the detection of electromagnetic waves that can measure more accurately.

This problem is solved by a device for the detection of electromagnetic waves with
  a first plate that contains a membrane and a detector structure fixed at least partially to the membrane,
  a second plate attached to the first plate,
  at least one contact point for surface mount technology on the first and/or second plate,
whereby a connection line between the detector structure and the contact point is at least partially led through the first and/or the second plate and that this connection line is at least partially prepared by film deposition and/or plating.

This problem is further solved by a device for the detection of electromagnetic waves with
  a first plate that contains a membrane and a detector structure fixed at least partially to the membrane,
  the membrane at least partially bordering a first closed cavity in the first plate and a second plate attached to the first plate, the second plate having a second closed cavity, the membrane at least partially bordering the second cavity.

The membrane preferably is made of a semi-conductor substrate, but can also be made of glass, ceramics, polymers, metal substrates, especially aluminium or can be made as a printed circuit board. Productionwise, the membrane can be attached to a base plate, like for example a semi-conductor substrate, in order to form the first plate. The membrane can also be produced directly from a base plate, like for example machining a cavity out of the base plate, leaving a remainder to border a cavity and form the membrane.

According to the invention, the detector structure can be fixed to the top (inner) side or the back (outer) side of the membrane. Furthermore, the first plate can have at least one connection line lead through it with the detector structure being at least partially fixed to the top or the back side of the membrane. Also, the second plate can have at least one connection line lead through it with the detector structure at least partially on the membrane of the first plate being arranged on the side of the membrane facing the second plate or on the opposite side of the membrane. Each possible attachment of a plate with another plate can allow for sealing rings to be arranged between the plates. Preferably the plates of the devices are designed in such a way, that they have the same side length, allowing the completed devices to be easily handled as a block, possibly of rectangular or quadratic shape.

The device according to an embodiment of the invention has at least a contact point, normally two or more contact points, like pads or balls, for surface mount technology on the first and/or the second plate. The device according to this embodiment is designed for being attached to surrounding structures by means of surface mount technology and thereby offers the advantages associated with this technology, like for example a reduced board size and weight, an increased performance and reliability and a fully automated, rationalised production. The plate-design of the invention and the later described production method according to the invention allow the device for the detection of electromagnetic waves to produced and designed in such a way, that attachment of this device to the surrounding structures by means of surface mount technology becomes possible.

In a preferred embodiment, the second plate is connected to the backside of the first plate, which first plate contains the detector structure on a side of the membrane facing the second plate. For reasons of simplicity, further aspects of the invention will be described with respect to this preferred arrangement, not limiting the disclosure of the following further aspects to this embodiment, however, as they are also applicable to the possible arrangements of first and second plate and of connection lines as described above.

Using this second plate at the backside of the first plate allows for connection lines to run through the second plate that can easily be connected with the detector structure, which has been arranged on the side of the first plate facing the second plate, namely the backside of the first plate. By building the detector structure on the backside of the first plate, the connection between the detector structure and the connection line can easily be achieved by surface contact for example. This does a way with the free standing wires of DE 41 02 524 A1, that can only be produced in a costly fashion. For example, the type of design according to the invention allows for the connection line to be produced by material deposition into cutouts of the plate through which the connection line to be lead.

According to the invention, leading the connection line for the detector structure at least partially through the respective plate especially means leading the connection line through the respective plate in such a way, that they terminate on the facing surface of the plate, i.e. the surface facing the other plate, and especially means, that these termination points are located distanced from the edge between the this surface and any outer side surface of the respective plate. From this facing side of the respective plate, the connection line is thus first led into the plate. In a preferred embodiment, the connection line is led completely through the respective plate, especially in a straight line. According to the invention, the connection line leading into the plate can however be led from the inside of the plate to one of the side surfaces of the plate, if connectivity to other elements requires this.

A connection line according to the invention is a connection between contact points of the device that are forseen for further connecting the signal path from the detector structure to lines on the surrounding structures. Since the invention allows for a multitude of detector structures to be used, the term contacts of the detector structure has to be understood broadly in the sense that these contacts can for example be the end-points of a thermocouple, but can also be especially provided contacts of a detector structure that is can for example be a sub-structure itself. Therefore, the connection line does not have to be an element produced in a single manufacturing step, but can be a line that consists of several sub-elements. According to the invention, at least one of these sub-elements is lead through the first and/or the second plate in the manner described above and at least this or one sub-element is prepared by film deposition and/or plating.

Examples of techniques for film deposition are evaporation, sputtering or chemical vapour deposition (CVD). Plating can for example be achieved by galvanic plating or electroless plating.

Using a second plate also allows for a second closed cavity to be formed in the second plate in the area of the detector structure. Such a device can further contain a third plate that is attached to the front side of the first plate, like for example the top plate is attached to the lower plate in DE 199 23 606 A1 having a cavity in the area of the detector structure or closing an opening in the first plate. This allows the detector structure to be surrounded by a top cavity and a lower cavity, which enhances the accuracy of the measurement, as the detector structure is separable from material agglomerations, that for example conduct heat to the detector structure and thereby offset the measurement.

The key of this aspect of the invention is, that in its built-in arrangement, the membrane carrying the detector structure is surrounded on its top and bottom side by closed cavities, that surround the membrane at least in the region of the detector structures. The existence of closed cavities allowing for accurate measurements, as no distortion of the electromagnetic waves passing through the cavity takes place and the detector structure is shielded from influences of the surrounding elements. In the built-in state, the cavities are completely closed, with the only exception, that a fluid connections may exist between the first and the second cavity.

Complete closure of the cavities is preferably achieved by the cavities being produced in the material of the first and second plate in such a manner, that the cavities only open towards the facing side of these two plates, whereby the cavities are then fully closed by the membrane. The cavities can however also be produced as cuts or clearances in a plate, which cut or clearance is closed on the one side by the membrane and on the other side by a further plate that is arranged on the plate with the clearance, like for example the third plate mentioned below arranged on the first plate.

The cavities are preferably not delimited by parts of surrounding structures, like printed circuit boards or the like, to which the device according to the invention is affixed, as this step of affixing the claimed device to the surrounding structures is often done by manufacturing steps that do not guarantee that the thus closed cavity is fully sealed.

Preferably, especially in designs, where the cavity delimiting membrane and a surface opposite to the membrane, that delimits the cavity on the side opposite to the delimitation by the membrane, exist, the distance between the detector structure and this surface is between 2 to 3 µm.

The cavities can be filled with fluids, preferably a gas. According to a preferred embodiment, a vacuum is created inside the cavities.

In designing the device to be made up of a first plate, a second plate and—where appropriate—a third plate, the devices according to the invention allow for easy manufacturing. The plates can be produced as part of separate wafers, with all the connections and structural built up, like building up the detector structure on the membrane and the production of the membrane, being done during the production of the respective wafer. By attaching the wafers to each other to form a wafer-sandwich and by separating the wafer-sandwich to obtain the device, production with a minimum of production steps is achieved. Furthermore, the production of the respective wafers can take place in different manufacturing surroundings, especially in production plants specialised for the respective process, and then easily joined together to form the inventive device.

If according to a special embodiment, the third plate contains a lens, like for example disclosed in DE 199 23 606 A1 with respect to the top plate, this third wafer containing the third plate can for example be produced in manufacturing surroundings that are specialized for producing lenses on wafers, while the first wafer carrying the first plate with the detector structure built on it can be produced in manufacturing surroundings that are specialized in building detector structures on wafers.

The separate production of sub-structures, like producing a wafer-sandwich of a wafer containing the third plate and a wafer containing the first plate and connecting this first wafer-sandwich to a wafer that contains the second plate at a later stage, is to be understood as part of the production method according to the invention, which allows for a multitude of combinations of production steps.

If two wafers are to be bounded to each other according to the production method of the invention, this can favourably be done by means of silicon-bonding, including cold-silicon-bonding, anodic bonding, eutectic bonding or bonding with polymers, soldering, welding, especially laser welding.

In a preferred embodiment, the plates are attached to each other at their facing surfaces. This is particularly advantageous, if the devices are produced by means of attaching wafers to each other. Using the facing surfaces as attachment surfaces also allows for large areas to be used as connecting areas.

In a preferred embodiment, the detector structure contains at least one thermocouple. Such a detector structure can be advantageously used for detecting electromagnetic waves in the infrared spectrum, allowing the device according to the invention to be used as part of a thermometer, for example. The invention is however not limited to detection structures that contain thermocouples. The detection structures can for example also contain resistor (for example for Bolometers), or can for example be based on thermal expansion (for example for Golay-Cells). Also the detector structure can be thus designed to allow the device to be used as a band-gap detector.

Dependent on which kind of detector structure is used, only parts of the detector structure should be fixed to the membrane and other parts should be situated at other parts of the device, away from the membrane. DE 41 02 524 A1 shows for example, that with a thermocouple, the hot connection point can be arranged on the membrane and the cold connection point can be arranged on the substrate.

In a further preferred embodiment, the detector structure consists of an array of at least two detectors, wherein each chip contains at least one thermocouple. Connecting detectors with thermocouples into an array to form the detector structure has manufacturing advantageous.

According to a preferred embodiment, the detection structure can be configured as a surface mount device (SMD)-structure. Such a structure allows an easy connection of the detection structure to the first plate. Furthermore, such a structure allows connectors from connection points to the SMD-structure to be produced on the surface of the first plate, allowing easy connection to the connection line that is at least partially led through the second plate.

In a further preferred embodiment, the second plate and—where appropriate—the third plate contain a semi-conductor substrate. The first plate, the second plate and/or the third plate can for example contain a semi-conductor layer. This facilitates the production of the device according to the invention, because the respective wafer can be built up based on the respective semi-conductor layer.

According to a further embodiment, the first plate, the second plate and—where appropriate—the third plate contain the same semi-conductor substrate. This is especially advantageous, where the detector structure is to be thermally isolated from the surroundings. Using the same semi-conductor substrate in each of the plates used allows for an easy control of thermal conduction through the substrate and hinders temperature gradients across the device. In a specially preferred embodiment, the semi-conductor substrate is silicon. The first plate, second plate and/or the third plate can however also be made of glass, ceramics, polymers and metal structures, especially aluminium and can also be made as printed circuit boards (PCB).

According to a preferred embodiment, the third plate is penetrable by the electromagnetic waves to be measured. This allows the device to be arranged in such a way, that the second (lower) plate can be attached to a further object, the device according to the invention being aligned in such a way, that the electromagnetic waves to be measured enter the device through the third plate.

In a further, possibly alternative embodiment, the second plate can (possibly also) be made penetrable by the electromagnetic waves to be measured. This allows for a different arrangement of the device according to the invention in relation to the source of electromagnetic waves that are to be detected, especially also allows for electromagnetic waves to pass through gap in a structure, possibly a printed circuit board, provided below the second plate, to which the second plate is attached, to be received and detected by the detector structure.

According to a preferred embodiment, the penetrable plate contains means for influencing the wave path of the electromagnetic waves, especially lenses. This allows the electromagnetic waves to be detected to be focussed on the detector structure and therefore allows for a more efficient detection.

According to a preferred embodiment of the invention, an outward facing side of the device is at least partially coated with a reflective material, like gold or aluminium. This reflective material preferably is arranged to surround that part of the respective plate made penetrable for the electromagnetic waves to be detected, where such penetrable parts are foreseen. The use of reflective material allows for the remainder of the structure to be uninfluenced by waves that do not pass the penetrable part and are thus not part of the wave-bundle that is to be detected.

In an alternative or in addition, according to a preferred embodiment of the invention, an outward facing side of the device is at least partially coated with a absorptive material, like a polymer. This absorptive material preferably is arranged to surround that part of the respective plate made penetrable for the electromagnetic waves to be detected, where such penetrable parts are foreseen. The use of absorptive material allows for the remainder waves that do not pass the penetrable part and are thus not part of the wave-bundle that is to be absorbed, where this is desired, for example in arrangements where influences on the amount of measured electromagnetic waves through electromagnetic waves being reflected from parts of the device and re-reflected into the device are to be minimised.

In cases where the device according to the invention is built with a top cavity and a lower cavity above or below the detector structure, respectively, it can be advantageous to provide for a fluid connection between the two cavities. This allows for a pressure balancing between the first and the second cavity, which prevents bending of a membrane carrying the detector structure and the measurement errors stemming from such a bent membrane.

According to a further embodiment, an application-specific integrated circuit (ASIC) is connected to at least one of the first plate, the second plate or the third plate. Providing a ASIC in the device according to the invention allows the device to be used for multiple-purposes.

In a preferred embodiment, the first plate contains a temperature sensor that is arranged separately from the detector structure. Such a temperature sensor allows for the measurement of the ambient temperature surrounding the detector structure, which can be used to calibrate the device.

According to the invention, the device can be a core device of a larger structure. The invention is thus not limited to a device that only has a first plate, a second plate and a third plate. Further plates can be attached to the topside of the third plate or the backside of the second plate. For example, a fourth plate containing an aperture can be arranged on the topside of the third plate.

BRIEF DESCRIPTION OF THE DRAWING

An embodiment of the invention will now be further explained with respect to the attached drawings, wherein.

DETAILED DESCRIPTION OF PREFERRED EMBODIMENTS

Figure 1:
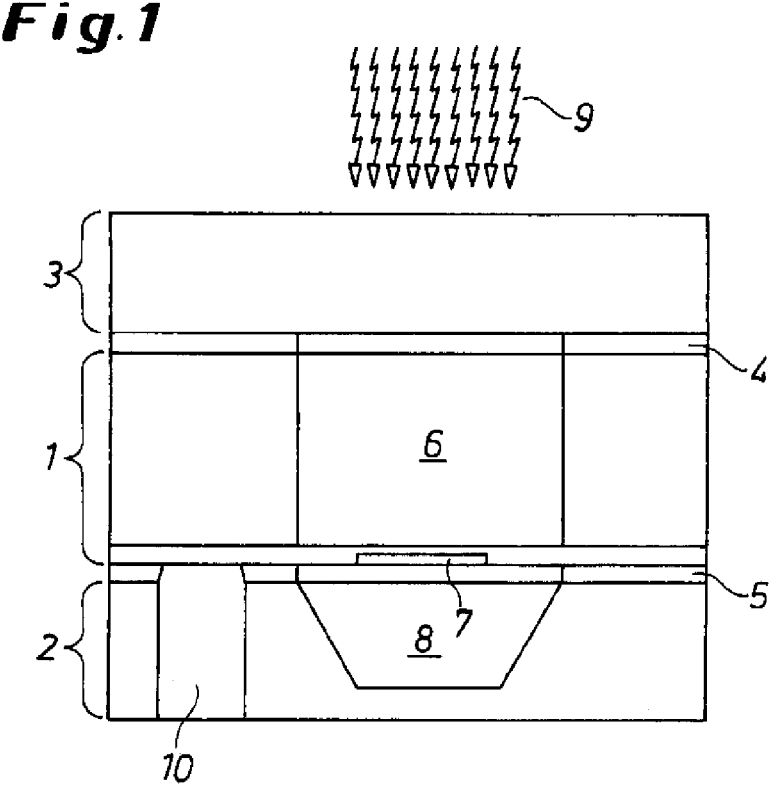
FIG. 1 shows a schematic side view of the device according to the invention.

As can be seen from FIG. 1, the device for detection of electromagnetic waves contains a first plate 1, a second plate 2 and a third plate 3, wherein the second plate 2 is attached to the backside of the first plate 1 and the third plate 3 is attached to the front side of the first plate 1. Sealing rings 4, 5 are arranged between the first plate 1 and the third plate 3 and the first plate 1 and the second plate 2, respectively.

The first plate 1 has an opening 6 that is leading from its front side to a detector structure 7 and which opening 6 is closed at its front side-end by the third plate 3.

The second plate 2 has a cavity 8 formed in the area of the detector structure 7.

The third plate is at least in parts made penetrable for the electromagnetic waves to be detected, so that the electromagnetic waves 9 can pass through the third plate 3 into the opening 6 and can be taken up by the detector structure in order to detect them. The electromagnetic waves 9 are for example infrared radiation that causes the detector structure 7 being made up of at least one thermal couple (thermopile) to take up this heat radiation and thereby detect the electromagnetic waves 9.

FIG. 1 also shows one connection line 10 that leads through the second plate 2 in order to connect with connection points (not shown) of connectors (not shown) that are arranged on the backside of plate 1 and that lead from the connection points to the detector structure 7. Further connection lines lead through the second plate, but are not visible in the section of the device as shown in FIG. 1.

Figure 2:
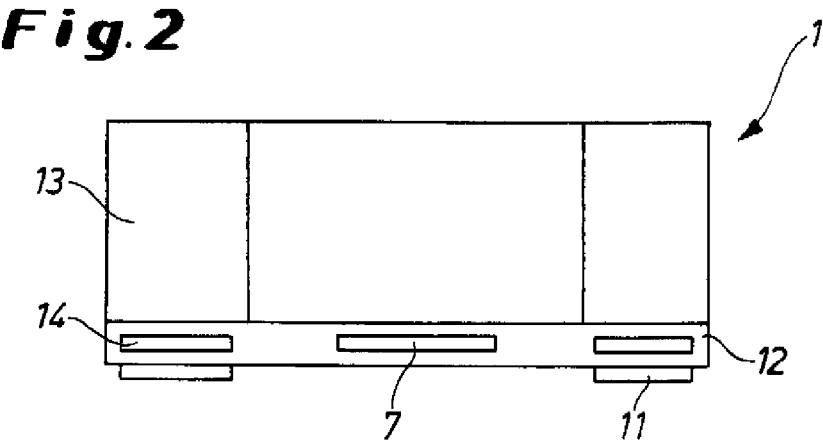
FIG. 2 shows a schematic side view of the first plate in separation and FIG. 3 shows a schematic side view of the second plate in separation.

The connection points are shown in FIG. 2. As can be seen from FIG. 2, the first plate has a membrane 12 as a base, on which the detection structure 7 and the contact points 11 are arranged, as well as a base plate 13.

FIG. 2 shows part of a connection 14 that leads from the connection point 11 to the detector structure 7.

Figure 3:
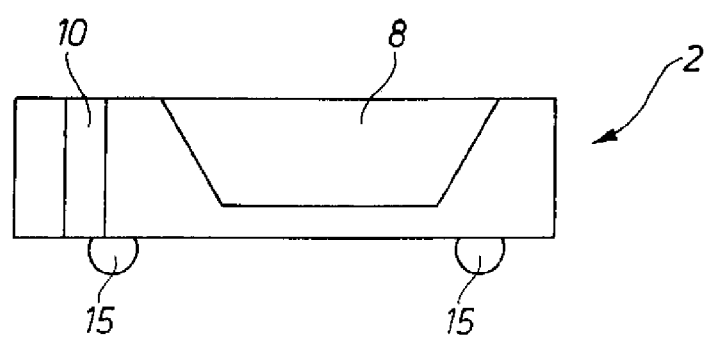

FIG. 3 shows the connection 10 that is led through the second plate 2. FIG. 3 also shows contact points 15 that are arranged at the end of respective connection line 10 in order to facilitate connection of the device to further objects by means of surface mount technology.

What is claimed is:

1. A device for the detection of electromagnetic waves, said device comprising:
   a first plate having a membrane and a detector structure fixed at least partially to the membrane;
   a second plate attached to the first plate;
   at least one contact point for surface mount technology on the first and/or second plate; and
   a connection line arranged between the detector structure and the contact point and at least partially led through the first and/or the second plate, wherein the connection line is at least partially prepared by film deposition and/or plating;
   wherein the second plate is penetrable by electromagnetic waves to be measured.

2. The device of claim 1, wherein the first and second plates are attached to each other at their facing surfaces.

3. The device of claim 1, wherein the detector structure includes at least one thermocouple.

4. The device of claim 1, wherein the detector structure includes an array of at least two detectors, with each of the detectors including at least one thermocouple.

5. The device of claim 1, wherein the detection structure is configured as a surface mount device (SMD)-structure.

6. The device of claim 1, wherein at least one of the first and second plates contains a semi-conductor substrate.

7. The device of claim 1, wherein the second plate contains means for influencing a wave-path of the electromagnetic waves.

8. The device of claim 1, wherein an outward facing side of the device is at least partially coated with a material reflective for electromagnetic waves.

9. The device of claim 1, wherein an outward facing side of the device is at least partially coated with a material absorptive for electromagnetic waves.

10. The device of claim 1, constructed to shield the detector structure from electric and/or magnetic fields.

11. The device of claim 1, further comprising an ASIC (Application-Specific Integrated Circuit) connected to at least one of the first and second plates.

12. The device of claim 1, wherein the first plate includes a temperature sensor arranged separately from the detector structure.

13. A device for the detection of electromagnetic waves, said device comprising:
   a first plate having a membrane and a detector structure fixed at least partially to the membrane, wherein the membrane at least partially borders a first closed cavity in the first plate; and
   a second plate attached to the first plate, said second plate having a second closed cavity, with the membrane at least partially bordering the second cavity;
   wherein the second plate is penetrable by electromagnetic waves to be measured.

14. The device of claim 13, further comprising a connection line arranged between the detector structure and a contact point for surface mount technology on the first and/or second plate, said connection line being at least partially led through the first and/or the second plate, said connection line being at least partially prepared by film deposition and/or plating.

15. The device of claim 13, wherein the membrane is at least partially arranged at a backside of the first plate, and the detector structure is at least partially fixed to the membrane on the backside of the first plate.

16. The device of claim 13, wherein the first and second plates are attached to each other at their facing surfaces.

17. The device of claim 13, wherein the detector structure includes at least one thermocouple.

18. The device of claim 13, wherein the detector structure includes an array of at least two detectors, with each of the detectors including at least one thermocouple.

19. The device of claim 13, wherein the detection structure is configured as a surface mount device (SMD)-structure.

20. The device of claim 13, further comprising a third plate closing one of the first and second cavities.

21. The device of claim 13, wherein at least one of the first and second plates contains a semi-conductor substrate.

22. The device of claim 20, wherein the third plate contains a semi-conductor substrate.

23. The device of claim 20, wherein at least one of the first, second and third plates contains a semi-conductor layer.

24. The device of claim 20, wherein the first, second and third plates contain a same semi-conductor substrate.

25. The device of claim 24, wherein at least one of the first, second and third plates contains silicon.

26. The device of claim 20, wherein at least one of the first and third plates is penetrable by electromagnetic waves to be measured.

27. The device of claim 13, wherein the second plate contains means for influencing a wave-path of the electromagnetic waves.

28. The device of claim 13, wherein an outward facing side of the device is at least partially coated with a material reflective for electromagnetic waves.

29. The device of claim 13, wherein an outward facing side of the device is at least partially coated with a material absorptive for electromagnetic waves.

30. The device of claim 13, constructed to shield the detector structure from electric and/or magnetic fields.

31. The device of claim 13 further comprising a fluid connection between the first cavity and the second cavity.

32. The device of claim 20, further comprising an ASIC (Application-Specific Integrated Circuit) connected to at least one of the first, second and third plates.

33. The device of claim 13, wherein the first plate includes a temperature sensor arranged separately from the detector structure.

34. A method for producing a device for the detection of electromagnetic waves, with the device including a first plate having a membrane and a detector structure fixed at least partially to the membrane, and a second plate attached to the first plate, said method comprising the steps of:
   producing at least one of the first and second plates as part of a first and a second wafer;
   attaching the first and second wafers to each other to form a wafer-sandwich; and
   singulating the device out of the wafer-sandwich;
   wherein the second plate is penetrable by electromagnetic waves to be measured.

35. The method of claim 34, further comprising the step of bonding two wafers to each other by a process selected from the group consisting of silicon-bonding, anodic bonding, eutectic bonding, and bonding with polymers.

36. A method for producing a device for the detection of electromagnetic waves, with the device including a first plate having a membrane and a detector structure fixed at least partially to the membrane, a second plate attached to the first plate, and a third plate closing a cavity of one of the first and second plates, said method comprising the steps of:
   producing at least one of the first, second and third plates as part of a wafer;
   attaching the first, second and third plates to each other; and singulating the device out of the wafer;
   wherein the second plate is penetrable by electromagnetic waves to be measured.

37. The method of claim 36, further comprising the step of bonding two wafers to each other by a process selected from the group consisting of silicon-bonding, anodic bonding, eutectic bonding, and bonding with polymers.

* * * * *